United States Patent
Oeda et al.

(10) Patent No.: US 7,275,090 B2
(45) Date of Patent: Sep. 25, 2007

(54) LOG ACCUMULATION DEVICE WITH USER ACCURACY SETTING MEANS AND PSEUDO-INFORMATION GENERATING MEANS

(75) Inventors: Shigeto Oeda, Fujisawa (JP); Akira Naito, Kodaira (JP); Tetsuo Shinagawa, Odawara (JP); Tomochika Ozaki, Yokohama (JP); Hiromichi Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 723 days.

(21) Appl. No.: 09/975,001

(22) Filed: Oct. 12, 2001

(65) Prior Publication Data

US 2002/0083162 A1 Jun. 27, 2002

(30) Foreign Application Priority Data

Dec. 19, 2000 (JP) ............................. 2000-389946

(51) Int. Cl.
 *G06F 15/16* (2006.01)
(52) U.S. Cl. .................................................. 709/219
(58) Field of Classification Search ........ 709/217–219, 709/223–226, 227–229; 713/200–201; 725/10; 707/1–10
See application file for complete search history.

(56) References Cited

U.S. PATENT DOCUMENTS

| | | | | |
|---|---|---|---|---|
| 4,912,552 | A | * | 3/1990 | Allison et al. ................. 725/21 |
| 5,977,964 | A | | 11/1999 | Williams et al. |
| 5,978,475 | A | * | 11/1999 | Schneier et al. ............ 713/177 |
| 6,014,674 | A | * | 1/2000 | McCargar ................... 707/202 |
| 6,061,683 | A | * | 5/2000 | Alonso ........................... 707/8 |
| 6,201,902 | B1 | * | 3/2001 | Sasaki et al. ............... 382/309 |
| 6,233,565 | B1 | * | 5/2001 | Lewis et al. ................... 705/35 |
| 6,275,824 | B1 | * | 8/2001 | O'Flaherty et al. ............ 707/9 |
| 6,321,234 | B1 | * | 11/2001 | Debrunner ................... 707/202 |
| 6,535,122 | B1 | * | 3/2003 | Bristol ........................ 340/506 |

(Continued)

FOREIGN PATENT DOCUMENTS

JP 04-057588 2/1992

(Continued)

OTHER PUBLICATIONS

"P3P 1.0: A New Standard in Online Privacy", P3P Public Overview, McCurry, http://www.w3.org/P3P/brochure.html, pp. 1-5.

(Continued)

*Primary Examiner*—Joseph E. Avellino
(74) *Attorney, Agent, or Firm*—McDermott Will & Emery LLP

(57) ABSTRACT

An information processing apparatus, such as might be associated with an in-home audio or video control device or a home appliance operated by a user, is provided with input allowing the user to set accuracy of a log of device operation history and/or to set a ratio of disclosure of the log information. A log accumulation control device efficiently collects the log information and offers users diversified levels of accuracy for the log information. In a further configuration, user-designated information acquired form user operation of the device identifies frequency of viewing and listening to each program, and reproduction of contents is controlled as a function of the user-designated information, e.g. to select among common contents and contents of different classification types.

5 Claims, 12 Drawing Sheets

U.S. PATENT DOCUMENTS

| | | | |
|---|---|---|---|
| 6,691,158 B1 * | 2/2004 | Douvikas et al. | 709/219 |
| 6,704,929 B1 * | 3/2004 | Ozer et al. | 725/13 |
| 6,708,335 B1 * | 3/2004 | Ozer et al. | 725/20 |
| 6,714,977 B1 * | 3/2004 | Fowler et al. | 709/224 |
| 6,754,904 B1 * | 6/2004 | Cooper et al. | 709/206 |
| 6,802,067 B1 * | 10/2004 | Camp et al. | 719/315 |
| 6,826,591 B2 * | 11/2004 | French et al. | 709/201 |
| 6,886,101 B2 * | 4/2005 | Glazer et al. | 726/26 |
| 6,934,508 B2 * | 8/2005 | Ceresoli et al. | 455/2.01 |
| 7,010,681 B1 * | 3/2006 | Fletcher et al. | 713/154 |
| 7,076,558 B1 * | 7/2006 | Dunn | 709/229 |

FOREIGN PATENT DOCUMENTS

| | | | |
|---|---|---|---|
| JP | 10150468 | * | 6/1998 |
| JP | 10-303983 | | 11/1998 |
| JP | 11-284584 | | 10/1999 |
| JP | 2000-032498 | | 1/2000 |
| JP | 2000-032499 | | 1/2000 |
| JP | 1 032 207 A1 | | 8/2000 |

OTHER PUBLICATIONS

Japanese Office Action for 200-389946, dated Aug. 11, 2006-designated (1).

Japanese Office Action for 2000-389946, dated Dec. 1, 2006-designated (2).

"P3P 1.0; A New Standard in Online Privacy", P3P Public Overview, McCurry, http://www.w3.org/P3P/brochure.html, pp. 1-5, © 1997-2003.

* cited by examiner

1001 CONTENTS INFORMATION
1002 CONTENTS SUBSTANTIAL INFORMATION
1004 COMMON CONTENTS INFORMATION
1005 CLASS A CONTENTS INFORMATION
1006 CLASS B CONTENTS INFORMATION
1003 CONTENTS SELECTION INFORMATION

1101 STORED USER-DESIGNATED INFORMATION

| PROGRAM NAME | FREQUENCY OF SIGHT AND HEARING |
|---|---|
| PROGRAM P | 8 TIMES |
| PROGRAM Q | 3 TIMES |
|  |  |
| PROGRAM R | ONCE |

LOG ACCUMULATION DEVICE WITH USER ACCURACY SETTING MEANS AND PSEUDO-INFORMATION GENERATING MEANS

BACKGROUND OF THE INVENTION

1. Field of the Invention

The present invention relates to a log acquiring system and a contents delivering system both capable of acquiring user-designated information corresponding to selection information determined according to the operation of each device by a user or the result of the device operation by the user, and changing offered contents, device operations and services rendered, according to the user-designated information, and particularly to a log acquiring system of a type wherein a user is able to specify the contents of an offered log.

2. Description of the Related Art

As to the acquisition of user-designated information corresponding to selection information determined based on the operation of an information processing apparatus or unit such as an in-home device of a user or the result of its operation, the user has heretofore carried out a setting as to ether or not a log has been provided for a specific log acquiring device or system, according to each log acquiring device. As to name information or the like indicative of semi-fixed user information other than log information, the user has designated or specified a setting as to whether or not a specific item of the user information has been provided, according to each log acquiring device.

The prior art has adopted the configuration wherein the log information has been specified according to the alternative as to ether or not it is provided. The degree of freedom related to the form of provision of the log information was low. The prior art cannot realize settings such as the provision of 40% of user-designated information as log information, etc.

A problem arises in that on the use side of the offered log information, the accuracy of the log information cannot be specified even for applications in which an accuracy of 100% is not necessary as the accuracy of the log information, and the log information is hard to use from the viewpoint of operational efficiency.

Further, the prior art is accompanied by a problem that since the user-designated information is provided as the log information with an accuracy of 100% were it is desired to provide or offer the log information, there is a tendency that a limitation is imposed on a user who provides the log information from the viewpoint of privacy protection, and both a user and a log user encounter difficulties in utilizing effective log information.

SUMMARY OF THE INVENTION

An object of the present invention is to provide an information processing apparatus herein a user is able to specify the accuracy of provision of log information. Another object of the present invention is to provide an information processing apparatus capable of acquiring user-designated information for other AV devices and home appliances connected to the information processing apparatus and setting the provision accuracy of log information by a user.

A further object of the present invention is to provide a log accumulation control device capable of efficiently collecting log information provided with diversified offered accuracies.

A still further object of the present invention is to provide an information processing apparatus or an AV device connected thereto capable of receiving contents information comprising both contents substantial information corresponding to contents to be transferred like contents such as motion pictures, voices, and contents selection information cable of selecting a method of reproducing at least partial contents substantial information, wherein a method of reproducing contents substantial information can be determined based on acquired user-designated information and contents selection information, or log information obtained by processing the user-designated information by use of accuracy information, and contents selection information.

In the present invention, an information processing apparatus such as an in-home device or the like is provided with a user-designated information acquiring means which acquires user-designated information including selection information about user's contents, and a user-designated information notifying means which generates log information obtained by restricting the acquired user-designated information according to a log accuracy setting and notifies it to an external device. The log accuracy setting is made by accuracy setting information outputted from a user-designated information accuracy setting means for specifying or designating the ratio of disclosure of the user-designated information to the external device. There is also provided a means for controlling the user-designated information notifying means according to accuracy setting information outputted from the user-designated information accuracy setting means capable of setting log accuracy by a user. Thus, log information obtained by restricting user-designated information with accuracy setting information corresponding to log accuracy information can be notified from the user-designated information notifying means to the external device, and the user is able to specify the accuracy of provision of log information for the information processing apparatus.

Further, the present invention is provided with a log storing means capable of classifying log information into at least two by-accuracy log information according to log accuracy information and storing the same. Thus, it is possible to individually store and refer to the collected log information according to accuracy classifications. The log information provided with diversified log accuracies from the information processing apparatus can be collected and managed with efficiency.

Furthermore, in the present invention, an AV function control means lying within an information processing apparatus for reproducing contents, or an AV device connected to the information processing apparatus is provided with a selection information processing means capable of determining a method of reproducing contents substantial information according to user-designated information and contents selection information, or log information and contents selection information, and a reproducing means capable of selecting and changing a method of reproducing contents substantial information according to the selection notice issued from the selection information processing means. Thus, the contents substantial information based on the user-designated information, or the log information and the contents selection information can selectively be reproduced.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
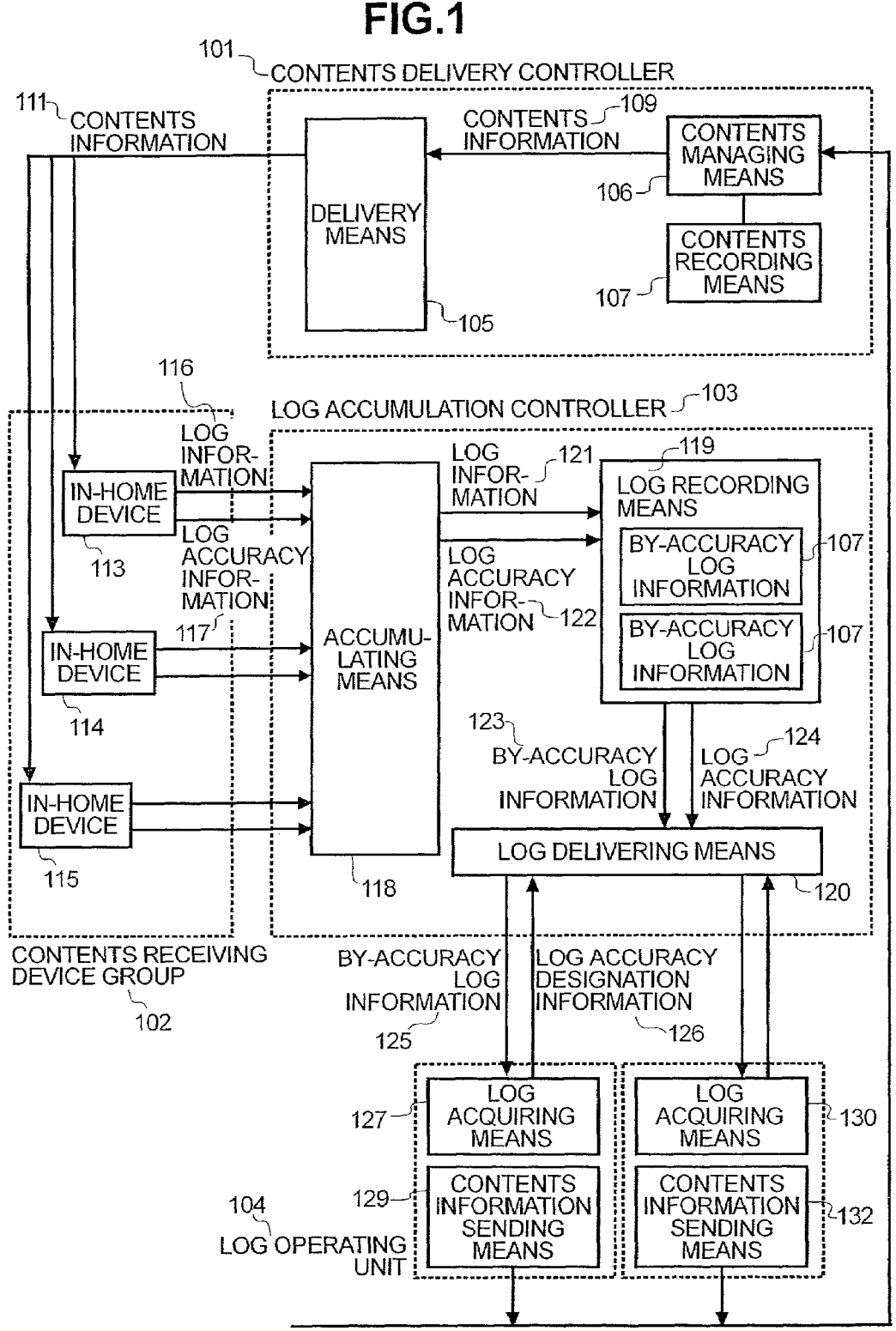
FIG. 1 is a diagram showing a system configuration according to one embodiment of the present invention.
Figure 2:
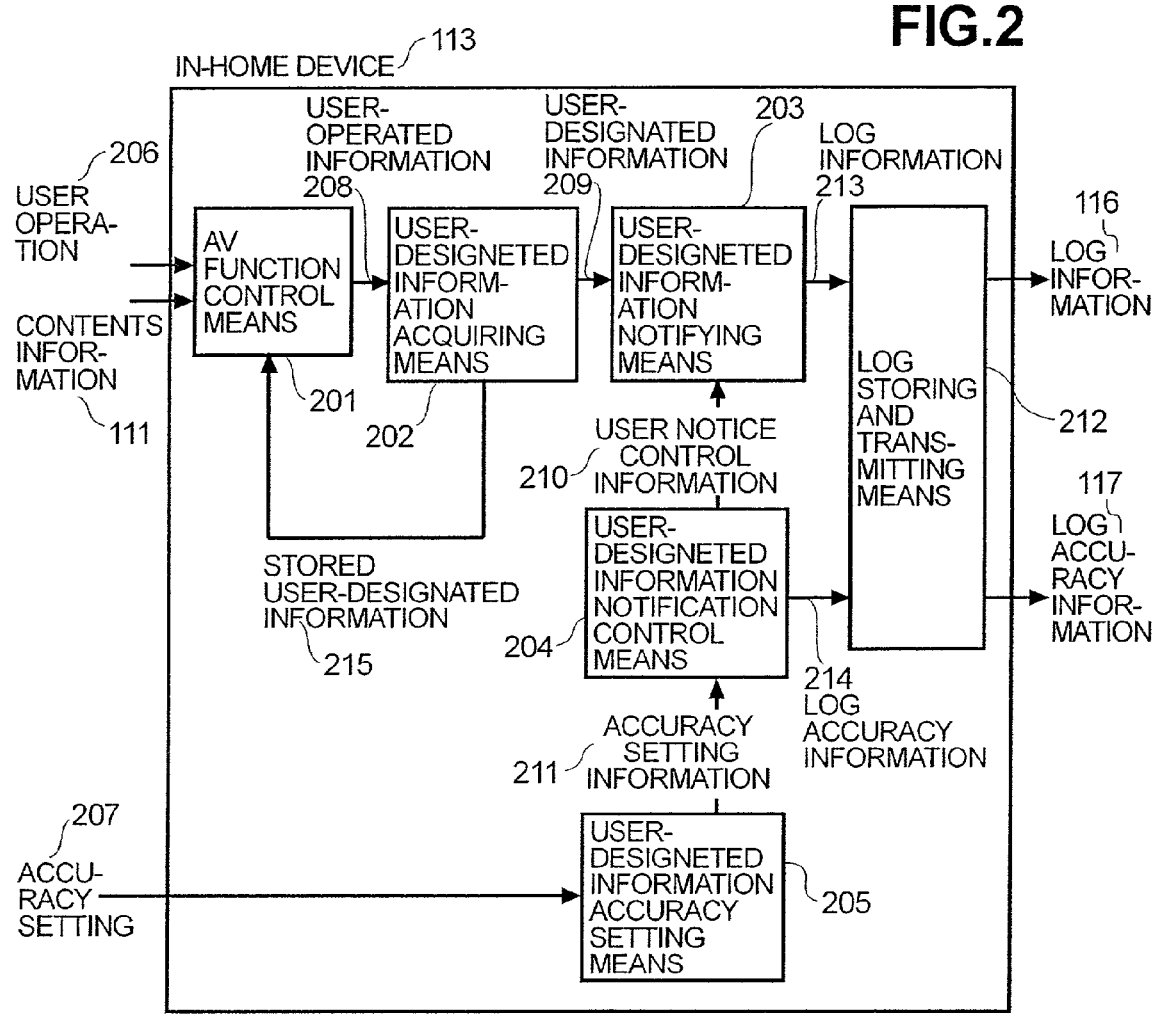
FIG. 2 is a function block diagram illustrating an in-home device according to one embodiment of the present invention.
Figure 3:
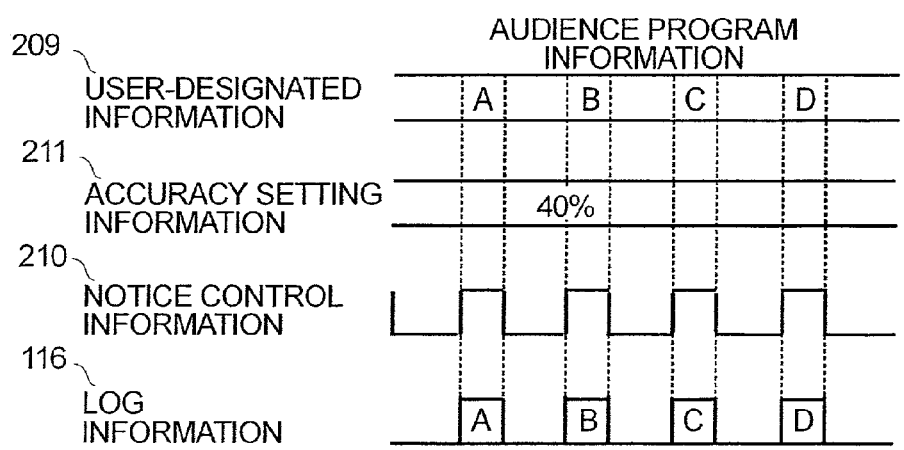
FIG. 3 is a diagram for describing the operation of the in-home device according to one embodiment of the present invention.
Figure 7:
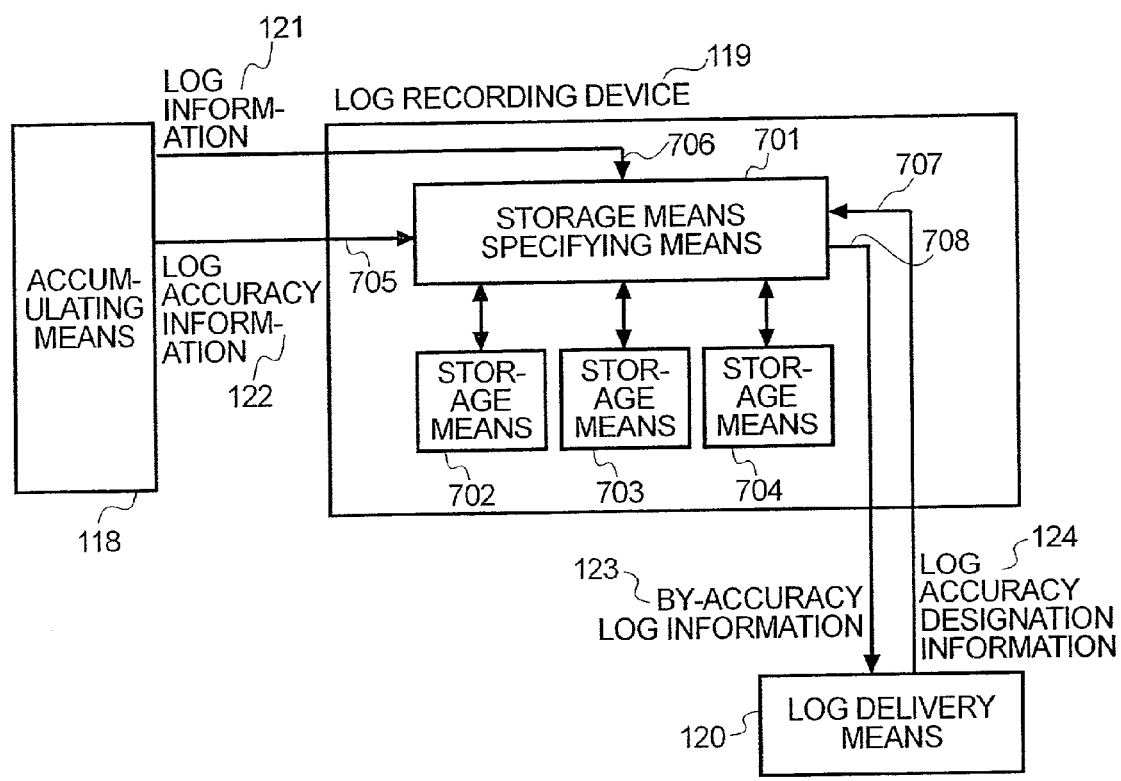
FIG. 7 is a function block diagram illustrating a log accumulation control device according to one embodiment of the present invention.
Figure 8:
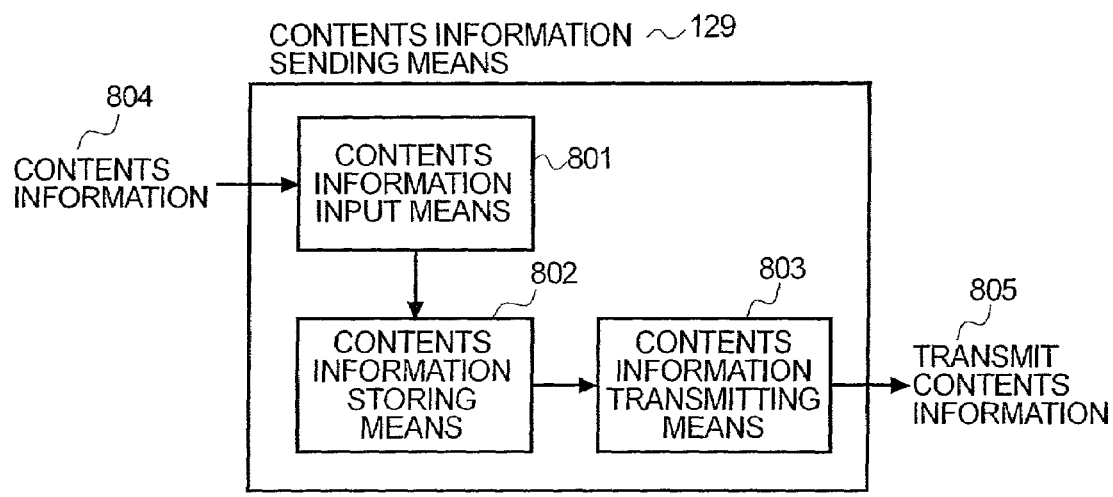
FIG. 8 is a function block diagram depicting a contents information transmitting means according to one embodiment of the present invention.
Figure 9:
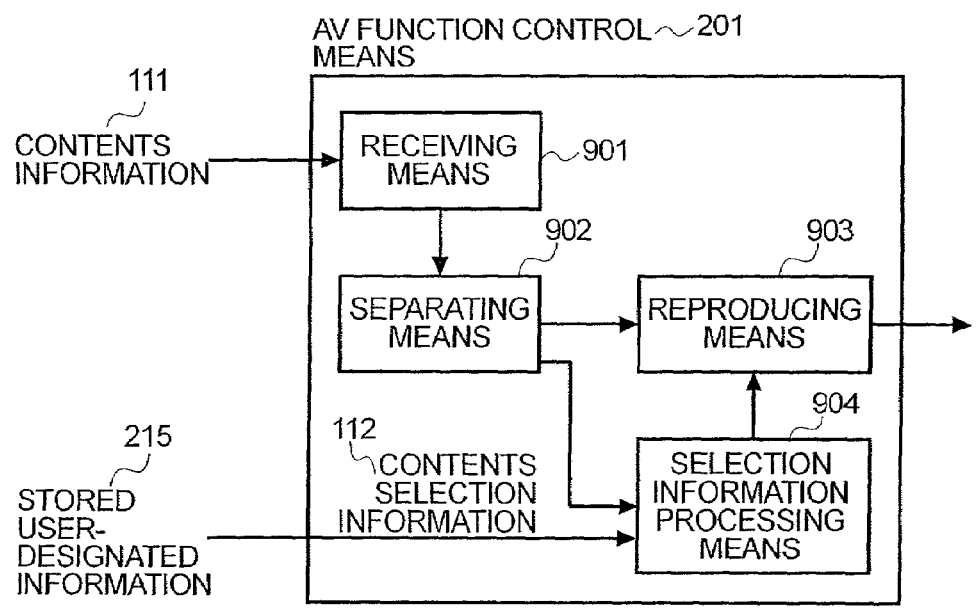
FIG. 9 is a function block diagram showing an AV control means according to one embodiment of the present invention.
Figures 10, 11:
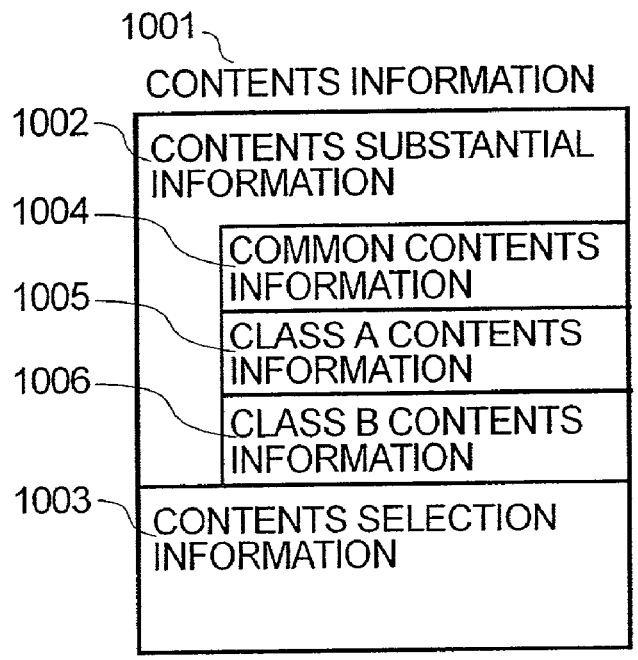
FIG. 10 is a data structure diagram showing contents information according to one embodiment of the present invention.
FIG. 11 is a diagram illustrating an example of stored log information according to one embodiment of the present invention.
Figure 12:
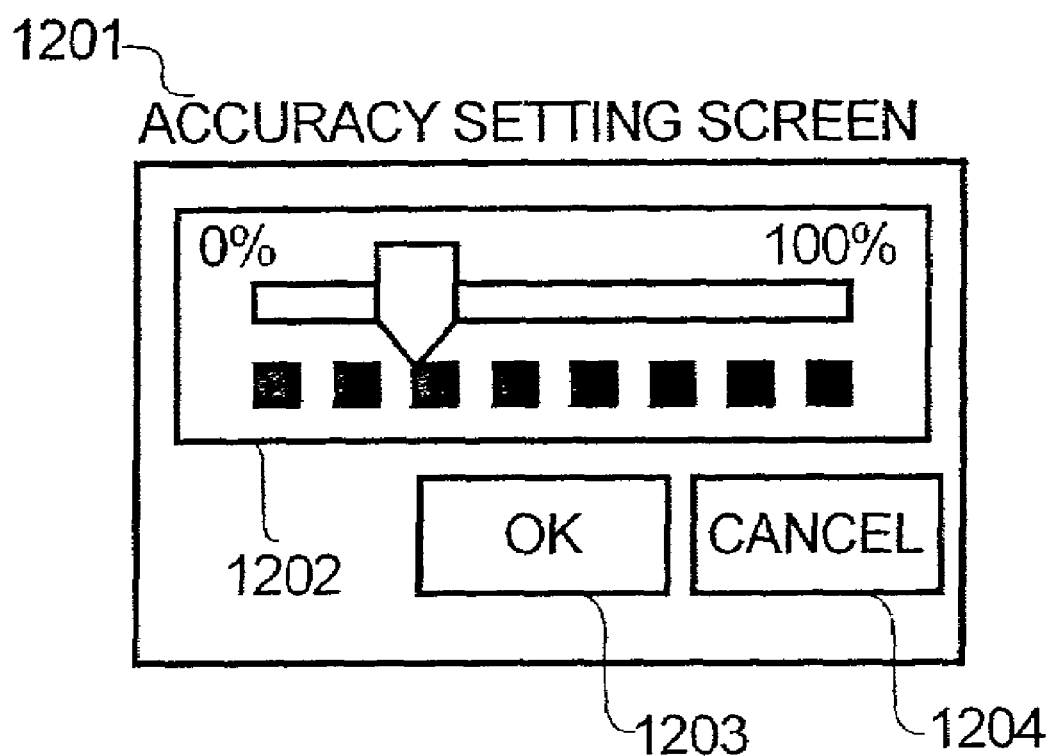
FIG. 12 is a diagram depicting an example of an accuracy information user input screen according to one embodiment of the present invention.

One embodiment of the present invention will hereinafter be described with reference to FIGS. 1 through 3 and FIGS. 7 through 12. FIG. 1 is a system configurational diagram showing a system configuration of the present invention, and FIG. 2 is a function block diagram of an information processing apparatus such as an in-home device or the like. This will be explained below as the in-home device. FIG. 3 is an operation explanatory diagram showing an example of the operation of the in-home device, FIG. 7 is a function block diagram illustrating a log accumulation control device, FIG. 8 is a function block diagram depicting a contents information transmitting or sending means, FIG. 9 is a function block diagram showing an AV function control means lying within the in-home device, FIG. 10 is a contents information data structure diagram illustrating the format of contents information, FIG. 11 is a diagram showing an example of stored user-designated information generated from user-designated information, and FIG. 12 is a diagram illustrating an example of a user input screen provided or offered by a user-designated information accuracy setting means lying in the in-home device, respectively.

In FIG. 1, reference numerals 113, 114 and 115 respectively indicate in-home devices having AV function control means, which are located in offices, homes, individual rooms lying within the homes, etc. In the present embodiment, each of the in-home devices 113, 114 and 115 has the function of reproducing or recording/reproducing contents information outputted from a contents delivery controller 101 and is connected to a display unit such as a TV. Reference numeral 101 indicates the contents delivery controller or control device which comprises a delivery means 105, a contents managing means 106, and a contents recording means 107. Reference numeral 102 indicates a contents receiving device group comprising a plurality of the in-home devices. Reference numeral 103 indicates a log accumulation controller comprising an accumulating means 118, a log recording means 119 and a log delivering means 120. Reference numeral 104 indicates a log operating unit comprising a log acquiring means 127 and a contents information sending or transmitting means 129.

Functions and operations of respective elements of structure employed in the system shown in FIG. 1 will be described with reference to the function block diagram. The function block diagram of the in-home device is in FIG. 2. In FIG. 2, reference numeral 201 indicates an AV function control means having the function of reproducing or recording/reproducing contents information. The AV function control means 201 notifies user operations such as upper and lower key operations made upon selection of contents, or a user-operated result such as contents information selected by a user operation to a user-designated information acquiring means as user-designated information. Reference numeral 202 indicates the user-designated information acquiring means capable of acquiring or obtaining the user-designated information and holding the user-designated information or user-designated characteristic information indicative of the characteristic of the user-designated information therein as stored user-designated information. The user-designated characteristic information may include accumulative audience times or the like set every contents information, which are obtained by acquiring information about the occurrence of selectively switching between the respective contents information from the user-designated information and about the time of occurrence of the selective changeover and performing calculations based on them. Reference numeral 203 indicates a user-designated information notifying means capable of ON/OFF-controlling the output of the user-designated information according to notice control information 210 and outputting the result of ON/OFF control on the user-designated information as log information. Reference numeral 205 indicates a user-designated information accuracy setting means for performing the setting of the accuracy of the log information by a user. Reference numeral 204 indicates a user-designated information notification control means for performing switching control on the user-designated information notifying means 203 according to log accuracy information. Reference numeral 212 indicates a log storing and transmitting means for storing or accumulating log information 213 outputted from the user-designated information notifying means 203 and log accuracy information 214 outputted from the user-designated information notification control means 204 and transmitting or optionally transmitting the same.

Incidentally, while the user-designated information is notified to the user-designated information notifying means 203 in the present embodiment, the user-designated characteristic information may also be notified thereto.

While the information processing apparatus is described as the in-home device, it may similarly be implemented even as a device placed outside the home.

The operation of the in-home device will be explained below with reference to FIG. 2. The AV function control means 201 notifies a user operation 206 indicative of a user's operation made to the AV function control means 201 to the user-designated information acquiring means 202 as user-operated information 208 in accordance with one used for the setting of a predetermined AV function relation corresponding to the user operation. The user-designated information acquiring means 202 generates user-designated information 209 from the user-operated information 208 and notifies it to the user-designated information notifying means 203. The operation of the user-designated information notifying means 203 will be explained using FIG. 3. The user-designated information accuracy setting means 205 notifies an accuracy setting 207 set by a user to the user-designated information notification control means as accuracy setting information 211. An example shown in FIG. 3 has shown where the user operates such a setting screen as shown in FIG. 12 by way of example to thereby set accuracy information to 40%. In response to it, the user-designated information notification control means 240 generates notice control information 210 in which the ratio between periods of "H" and "L" designated at numeral 210 shown in FIG. 3 is given as 40:60. While the period or cycle of this signal is not limited to it, the period thereof will be defined as a cycle of one hour, for example. When the notice control information 210 is "H", the user-designated information notifying means 203 outputs user-designated information 209 as log information 213. When the notice control information 210 is "L", the user-designated information notifying means 203 outputs "L" (indicative of the absence of information) as log information 213. The log information 213 is notified to the log accumulation controller 103 through the log storing and transmitting means 212 as log information 116. The log information outputted from the log storing and transmitting means 212 is designated at numeral 116 in FIG. 3. It is understood that as to 40% of the entire log information, which is specified by the user's accuracy setting, log information obtained from user-designated information with a actual user operation as a base is transmitted, whereas as to the remaining 60%, user-designated information is masked so that no log information is transmitted. Thus, the log information 116 includes user-designated information corresponding to a desired log accuracy set by a user.

Thus, according to the in-home device of the present embodiment described in FIG. 2, the accuracy of the log information can be changed according to the setting of accuracy of each log set by the user.

Incidentally, while the present embodiment has adopted the configuration in which the in-home device is implemented by hardware such as a CPU and memory or the like and software such as programs and data or the like, it may use a configuration in which some or all of the functions of the in-home device are implemented as software operated by another information processing apparatus such as a PC or the like, a system which is implemented as software operated by other information processing apparatuses connected to one another by a network and processes only their input/output functions by means of in-home devices, etc. No particular limitation is imposed on a method of implementing the function of each in-home device.

For instance, a configuration may also be adopted wherein at leas some of the functions of the user-designated information acquiring means, user-designated information notifying means, user-designated notification control means, user-designated information accuracy setting means, log storing and transmitting means, etc. all of which constitute each in-home device, are implemented as software and executed by means other than the in-home device, such as the log accumulation controller or the like. According to such a configuration, part of the function of the in-home device can be shifted to the center side as in the case of the log accumulation controller or the like, and hence the required function of the in-home device can be reduced.

The operation of the log storage or accumulation controller will be described below using FIG. 7. In FIG. 7, reference numeral 118 indicates an accumulating device capable of receiving log information and log accuracy information from at least two in-home devices, reference numeral 701 indicates a storage means specifying means for recording the log information 121 accumulated by the accumulating device in storage means corresponding to at least two log accuracy classifications according to log accuracy information 122, reference numerals 702, 703 and 704 indicate memory or storage means such as hard disk or the like, reference numeral 119 indicates a log recording device comprising the storage means specifying means 701 and the storage means 702, 703 and 704, and reference numeral 120 indicates a log delivery device capable of notifying log accuracy designation information 124 corresponding to notice information for specifying a log accuracy to the storage means specifying means 701, acquiring corresponding by-accuracy log information 123 from the storage means specifying means 701 and transmitting the acquired by-accuracy log information 123 to its corresponding log acquiring means.

In the log accumulation controller described in FIG. 7, the log information 121 and log accuracy information 122 transmitted from at least two in-home devices are received by the accumulating device 118 and notified to the storage means specifying means 701 lying within the log recording device 119. The storage means specifying means 701 sets log accuracy classifications comprised of two classifications of, for example, a log accuracy from above 0% to less than 50% and a log accuracy from above 50% to below 100%, and stores log information corresponding to the respective log accuracy classifications in the storage means different every log accuracy classifications. Thus, the log information can be recorded every accuracy classifications. The log information recorded every log accuracy classifications are transmitted to the log delivering means 120 according to the log accuracy designation information 124 of the log delivery device as the log information 123 set according to the accuracy. Thus, when a request to provide or offer the by-accuracy log information having the accuracy from over 50% to under 100% is made from the corresponding external log acquiring means, for example, the log acquiring means is capable of obtaining by-accuracy log information corresponding to a desired log accuracy classification according to the operation of the log delivering device.

According to the log accumulation controller of the present embodiment described in FIG. 7 as mentioned above, the log information transmitted from at least two in-home devices are classified according to accuracy. The log information related to the corresponding accuracy classification can be notified to the corresponding log acquiring means according to the by-accuracy log information acquisition request of the log acquiring means.

Incidentally, while the above-described present embodiment has adopted the configuration wherein the log information set by accuracy are recorded in the different storage means in FIG. 7, for example, a configuration may be adopted in which the log information are respectively stored in different areas of a single storage device. No particular limitation is imposed to a method of recording the log information set by accuracy. Further, while the present embodiment has adopted the configuration wherein the by-accuracy log information are classified and recorded upon reception of the log information, a configuration may be used wherein log information is recorded together with log accuracy information and log information corresponding to an accuracy classification designated upon its transmission is retrieved and transmitted. No particular limitation is imposed on a method of classifying log information according to accuracy. While the present embodiment has adopted the configuration wherein the corresponding log is always recorded in the corresponding storage means, for example, a configuration may also be used wherein, for example, an upper limit capacity of a log to be acquired is provided and old log information is deleted when it is desired to store log information greater than the capacity. A method of managing the acquired log information is not defined in particular.

Further, the present embodiment has adopted the configuration wherein the log acquiring means is capable of acquiring the log accuracy classification of the log information managed by the log recording device, and the log accuracy designation information is notified in accordance with the log accuracy classification. However, a configuration may also be adopted wherein arbitrary log accuracy designation information is notified and the optimum log accuracy classification is determined by the log recording device. In the present configuration as well, the log accuracy classification determined by the log recording device may be notified to the corresponding log acquiring device. No particular limitation is imposed on a method of formatting and notifying log accuracy designation information and a method of determining and notifying by-accuracy log information sent as a result of log accuracy designation information.

The operation of the contents information transmitting means of the log operating unit will be explained below with reference to FIG. 8. In FIG. 8, reference numeral 801 indicates a contents information input means capable of acquiring or obtaining contents information from the outside, reference numeral 802 indicates contents information storing means capable of storing the contents information obtained by the contents information input means 801, and reference numeral 803 indicates contents transmitting means capable of transmitting the stored contents information to the contents delivery controller.

According to the contents information transmitting means 129 lying within the log operating unit 104 shown in FIG. 8, contents information 804 automatically and/or manually generated based on the by-accuracy log information obtained by the log acquiring means 127 of the log operating unit 104 can be sent to the contents delivery controller 101 through the contents information sending means 129.

The present embodiment has adopted the configuration wherein the contents information is transmitted to the contents delivery controller through the contents information transmitting means shown in FIG. 8. However, no particular limitation is imposed on a contents information transmitting method such as a method of sending contents information through other dedicated/general-purpose communication means, a method of storing contents information in a storage medium and sending the medium with the contents information recorded therein, etc.

The operation of the AV function control means of the in-home device will next be explained with reference to FIG. 9. In FIG. 9, reference numeral 901 indicates a receiving means capable of receiving contents information 111 comprising contents substantial information and contents selection information 112. Reference numeral 902 indicates a separating means capable of separating the contents substantial information and the contents selection information from the contents information. Reference numeral 903 indicates means for reproducing the contents substantial information. Reference numeral 904 indicates a selection information processing means capable of specifying a method of reproducing the content substantial information according to the contents selection information and stored user-designated information 215.

FIG. 10 is a diagram showing a configuration of contents information, and FIG. 11 is a diagram showing a configuration of stored user-designated information. In the AV function control means shown in FIG. 9, the receiving means 901 is capable of obtaining the contents information having the configuration shown in FIG. 10. The separating means 902 separates the obtained contents information into contents substantial information 1002 and contents selection information 1003. In addition, the contents information 1002 is notified to the reproducing means 903, and the contents selection information 1003 is notified to the selection information processing means 904. As an example of the contents selection information, may be mentioned, a condition description that "when the frequency of sight and hearing of a program P or a program R is three times or mare, contents information corresponding to Class A is selected, and contents information corresponding to Class B is selected except for it" (condition 1003), etc. In the case of this example, the selection information processing means 904 determines a method of reproducing the contents information 1002 from the stored user-designated information 1101 and the contents selection information 1003. While the contents selection information is information shared between the respectively in-home devices, the stored user-designated information has inherent information corresponding to user operations every in-home devices, and the contents substantial information reproduced as a result can be changed according to each in-home device. When stored user-designated information of a given in-home device, for example is of the information shown in FIG. 11, the selection information processing means 904 instructs the reproducing means 903 to reproduce contents information 1005 corresponding to Class A, based on the condition 1003 and the stored user-designated information shown in FIG. 11. Thus, the reproducing means 903 reproduces common contents information 1004 and the contents information 1005 corresponding to Class A.

In the present embodiment as described above, the method of reproducing the common contents information and the contents information set according to the class has used the configuration wherein the contents information set according to the class is reproduced after the reproduction of the common contents information. However, it may adopt, for example, a configuration wherein common contents information is set as motion-picture information, contents information set according to the class is set as voice information, and the common contents information and the contents information set according to the class are simultaneously reproduced, a configuration wherein a plurality of common contents information and a plurality of by-class contents information belonging to the same class are provided, etc. No particular limitation is imposed on the configuration of contents information and its reproducing method.

Further, the present embodiment has adopted the configuration having the correspondence between the specific condition and the reproduced class as the contents selection information. However, for example, a configuration may be adopted wherein a selection condition corresponding to user-designated information is provided as contents selection information, and contents information related to the corresponding class is selected when a user-designated information condition lying within contents selection information and stored user-designated information included in each in-home device coincide with each other. No particular limitation is imposed on a method of selecting the contents selection information and a method of describing it.

Furthermore, the present embodiment has adopted the configuration herein the user-designated information acquired form the user operation is processed into information indicative of the frequency of sight and hearing set according to each program and held as the stored user-designated information. However, no particular limitation is imposed on the format and contents of the held information. Further, a configuration may be adopted wherein user-designated information is stored as it is without its processing, or a configuration may be adopted wherein user-designated information is stored without its processing and necessary processing is effected thereon upon selection of contents information set according to the class corresponding to contents selection information. No particular limitation is imposed on stored user-designated information, and the presence and absence of processing of the user-designated information and the timing provided to process the user-designated information.

According to the in-home devices each having the AV function control means of the present embodiment described in FIG. 9 as described above, the contents information reproducing method corresponding to the user-designated information stored in each in-home device can be selected and changed, and the delivery and reproduction of the contents corresponding to individual users who make use of the in-home devices respectively, can be carried out.

The operation of the log acquiring system comprising the above-described in-home devices, log accumulation controller, log operating unit, and contents delivery controller will next be explained with reference to FIG. 1. In FIG. 1, each of the in-home devices 113, 114 and 115 has the AV function control means 201 and is capable of reproducing contents information and reproducing/recording it. User-designated information comprised of operations such as the selection of the contents information and the reproduction and recording thereof is transmitted to the log accumulation controller 103 as log information according to each individual log accuracy set by users. The log accumulation controller 103 records the log information as by-accuracy log information every at least two accuracy classifications corresponding to log accuracy classifications on the basis of log information/log accuracy information sent from at least two in-home devices. The log acquiring means 127 and 130 of the log operating unit 104 are respectively capable of specifying log accuracies and acquiring desired log information from the log accumulation controller. Further, the log operating unit 104 is capable of automatically or manually creating contents information from at least one by-accuracy log information acquired, and sending the contents information to the contents delivery controller 101 through the contents information transmitting means 129 and 132. The contents delivery controller 101 manages the contents information by use of the contents managing means 106 and delivers it to each of the in-home devices 113, 114 and 115 through the use of the delivery means 105. The in-home devices 113, 114 and 115 are capable of selectively reproducing the received contents information according to stored user-designated information and contents selection information included in contents information.

According to the present embodiment, the user is able to set the accuracy of transmitted log information through the use of the in-home device upon sending and disclosure of the user-designated information produced based on the user operation obtainable in each in-home device to the external means such as the log accumulation controller.

According to the present embodiment, the log accumulation controller is capable of arranging the various log informations corresponding to the log accuracy settings of the users different every in-home devices according to the accuracy classifications and storing them. Further, the log accumulation controller is capable of offering desired by-accuracy log information corresponding to the log accuracy designation of the log operating unit to the log operating unit. Thus, log information exceeding a necessary log accuracy is not obtained at the log operating unit, and hence the efficiency of operation of the log information is improved. Further, upon creation of the contents information by the log operating unit, the log operating unit is capable of creating and sending contents information including contents information set every user segments based on the by-accuracy log information.

The contents information created by the log operating unit is sent to the contents delivery controller. The contents delivery controller acquires and manages the contents information and delivers the same to each of the in-home devices. It is thus possible to make a change in contents information according to each user segment and hence improve the operating efficiency of the contents information. Further, the user is able to acquire desired contents information.

Incidentally, while the present embodiment has adopted the configuration wherein the contents information sent from the log operating unit includes information about the selection of the contents information, a configuration may also be adopted wherein contents information with no contents selection information is transmitted. No particular limitation is imposed on the format and contents of the contents information sent to the contents delivery controller.

In the present embodiment as well, the contents delivery controller delivers the contents sent from the log operating unit. However, the delivery of other contents information or the delivery of the contents information and other contents information sent from the log operating unit in mixed form is also made feasible. No particular limitation is imposed on the delivery origin of the contents information or the contents and delivery path of the contents information.

While the present embodiment has adopted the configuration wherein the log operating unit has the log acquiring devices and the contents information transmitting means, a configuration may be adopted wherein the log operating unit has only the log acquiring devices, or a configuration may also be adopted which is used as another sending method for recording the acquisition of by-accuracy log information in, for example, a storage medium and mailing it, and wherein the log operating unit has only the contents information sending means. The configuration of the log operating unit is not limited to the configuration of the present embodiment.

While the contents delivery controller is configured so as to deliver the contents sent from the log operating unit in the present embodiment, the delivery of contents information created by one other than the operating unit is allowed. No particular limitation is imposed on the method for creating the contents to be delivered and its configuration.

While the log accumulation controller according to the present embodiment is configured so as to manage the log information according to log accuracy classification, a configuration or the like may be adopted wherein log information are recorded and managed according to log accuracy information. No particular limitation is imposed on the method for classifying and managing the log information.

Figure 4:
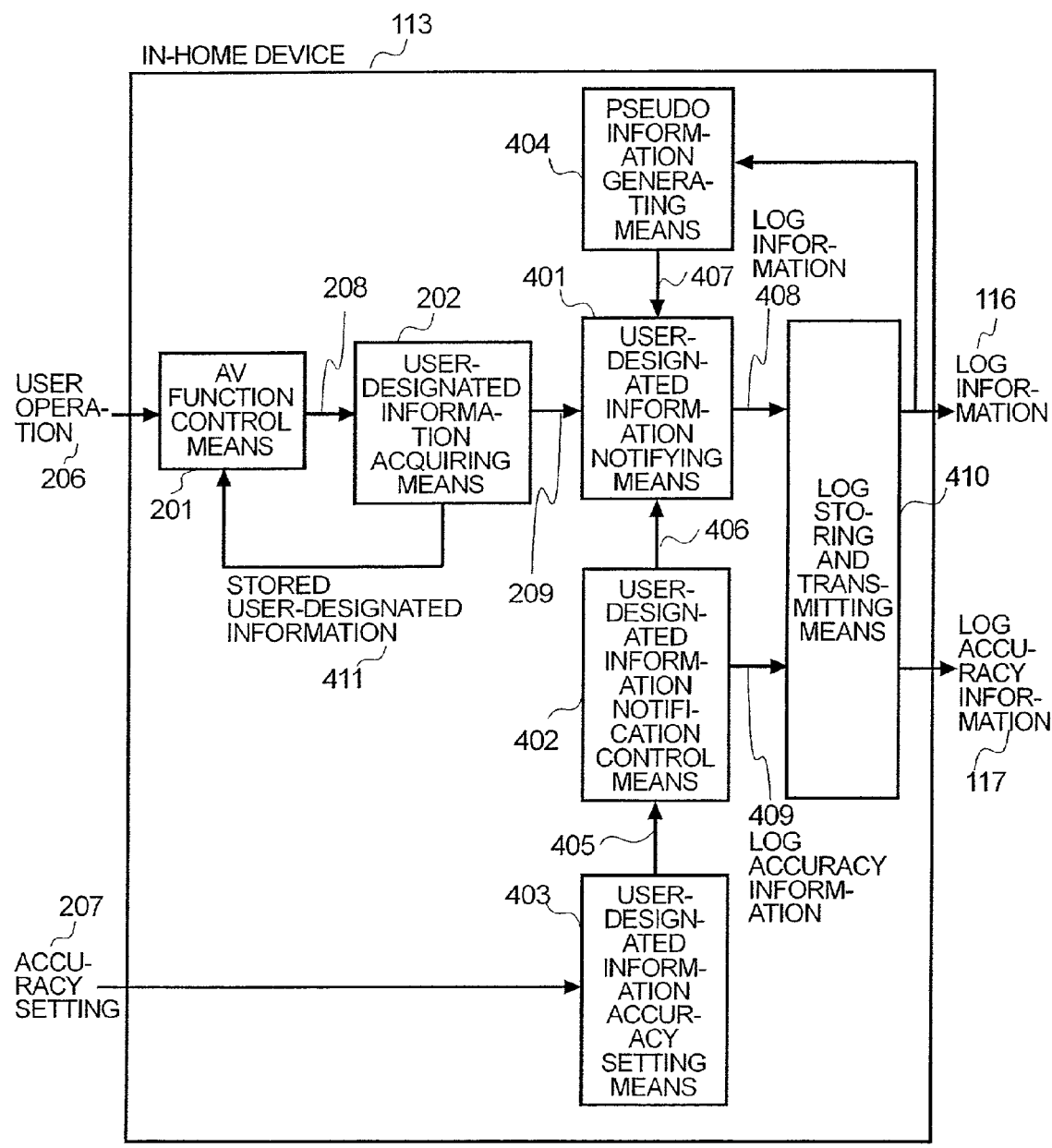
FIG. 4 is a function block diagram illustrating an in-home device according to another embodiment of the present invention.
Figure 5:
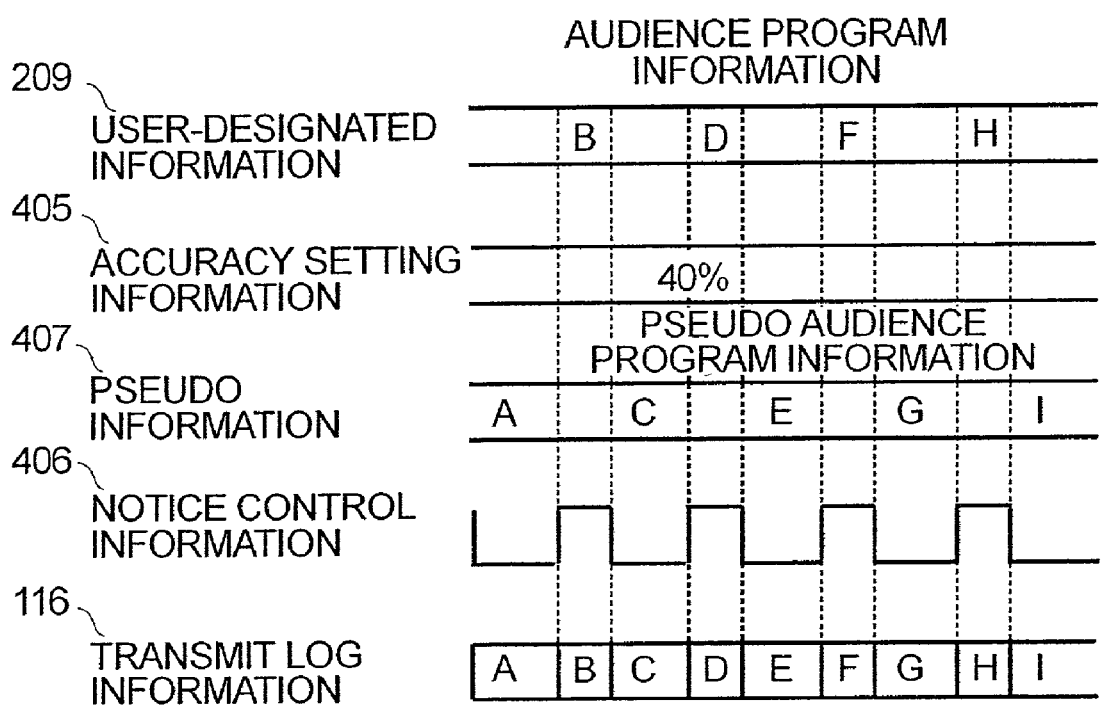
FIG. 5 is a diagram for describing the operation of the in-home device according to another embodiment of the present invention.

Another embodiment of the present invention will be explained below with reference to FIGS. 4 and 5. FIG. 4 is a function block diagram showing a configuration of an in-home device. In FIG. 4, reference numeral 403 indicates a user-designated information accuracy setting means which performs the setting of the accuracy of log information by a user, reference numeral 402 indicates a user-designated information notification control means for performing switching control on the user-designated information notifying means 401 according to log accuracy information, reference numeral 401 indicates a user-designated information notifying means capable of performing switching between an output indicative of or corresponding to user-designated information and the output of a pseudo information generating means 404 and outputting the result of switching control as log information, and reference numeral 404 indicates the pseudo information generating means capable of generating pseudo user-designated information.

The pseudo information generating means 404 generates user-designated information and pseudo user-designated information indicative of information about a pseudo pattern. As an example of a method for generating them, may be used, for example, a method of cutting out log information transmitted in the past every predetermined periods at random and connecting then to thereby generate pseudo user-designated information.

The operation of the in-home device according to the present embodiment will be explained below with reference to FIG. 5. As to user-designated information 209, accuracy setting information 405 is notified to the user-designated information notification control means 402 according to an accuracy setting set by a user through the user-designated information accuracy setting means 403. The user-designated information notification control means 402 generates notice control information 406 having the ratio between "H" and "L" corresponding to accuracy. When the accuracy setting information is given as an accuracy of 40%, for example, the user-designated information notification control means 402 generates notice control information in which the ratio of "H" to "L" is given as 2:3. While the period thereof is arbitrary, it is set as 30 minutes in the present embodiment. According to the present notice control information 406, the user-designated information notifying means 401 outputs user-designated information during an "H" period, and outputs pseudo user-designated information as log information during an "L" period. Thus, some kind of log information is generated at all times, and user-designated information based on an actual user operation can be generated as log information containing only 40% of its entirety. According to the in-home device of the present embodiment, it becomes difficult to make a distinction between the user-designated information and pseudo user-designated information contained in the log information. Thus, user's privacy protection against the log information can be enhanced.

Incidentally, the present embodiment has adopted the configuration wherein the past log information is utilized as the method of generating the pseudo user-designated information. However, no particular limitation is imposed on the method of generating the pseudo user-designated information.

Figure 6:
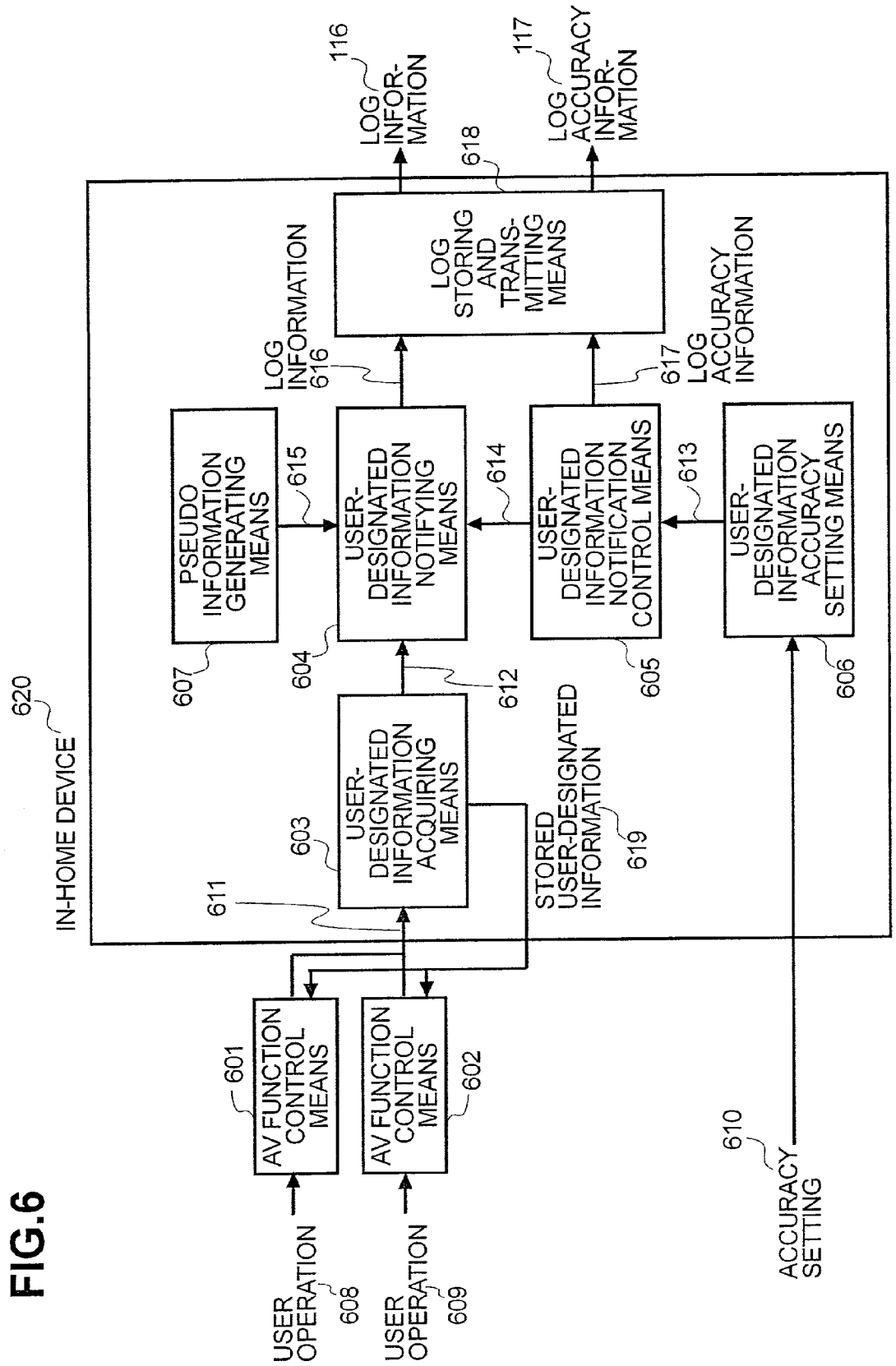
FIG. 6 is a function block diagram showing an in-home device according to a further embodiment of the present invention.

A further embodiment of the present invention will be explained below with reference to FIG. 6. FIG. 6 is an in-home device function block diagram showing a configuration of an in-home device according to the present embodiment. In FIG. 6, reference numeral 603 indicates a user-designated information acquiring means capable of performing the acquisition of a user operation from an AV function control means placed outside the in-home device and the notification of stored user-designated information thereto by means of same kind of communication means such as wire and wireless communications, reference numeral 607 indicates a pseudo information generating means, reference numeral 604 indicates a user-designated information notifying means, reference numeral 605 indicates a user-designated information notification control means, reference numeral 606 indicates a user-designated information accuracy setting means, and reference numeral 618 indicates a log storing and transmitting means, respectively. The operation of the present embodiment will be described below with reference to FIG. 6. The AV function control means 601 and 602 are respectively external devices independent of the in-home device 620 and are capable of regularly of appropriately communicating with the in-home device by means of wire/wireless communication means. Each of the AV function control means notifies a user operation for each AV function control means to the user-designated information acquiring means 603 of the in-home device through the communication means. A process for generating user-designated information from the user operation obtained by the user-designated information acquiring means 603 is similar to the previous embodiment and the description thereof will therefore be omitted herein. Further, the acquired stored user-designated information is notified to each of the external AV function control means by the user-designated information acquiring means 603.

According to the present embodiment as described above, the user operations for the AV function control means (AV devices) placed outside the in-home device can also be acquired by the in-home device, and the degree of freedom of the utilization of each device by a user is improved. Further, when the stored user-designated information is notified to the AV function control means placed outside the in-home device, the external AV function control means is also capable of selectively reproducing the contents information using the stored user-designated information. Thus, the contents information can selectively be reproduced even when a plurality of AV function control means are simultaneously used, for example, thereby making it possible to improve user's operability.

Figure 13:
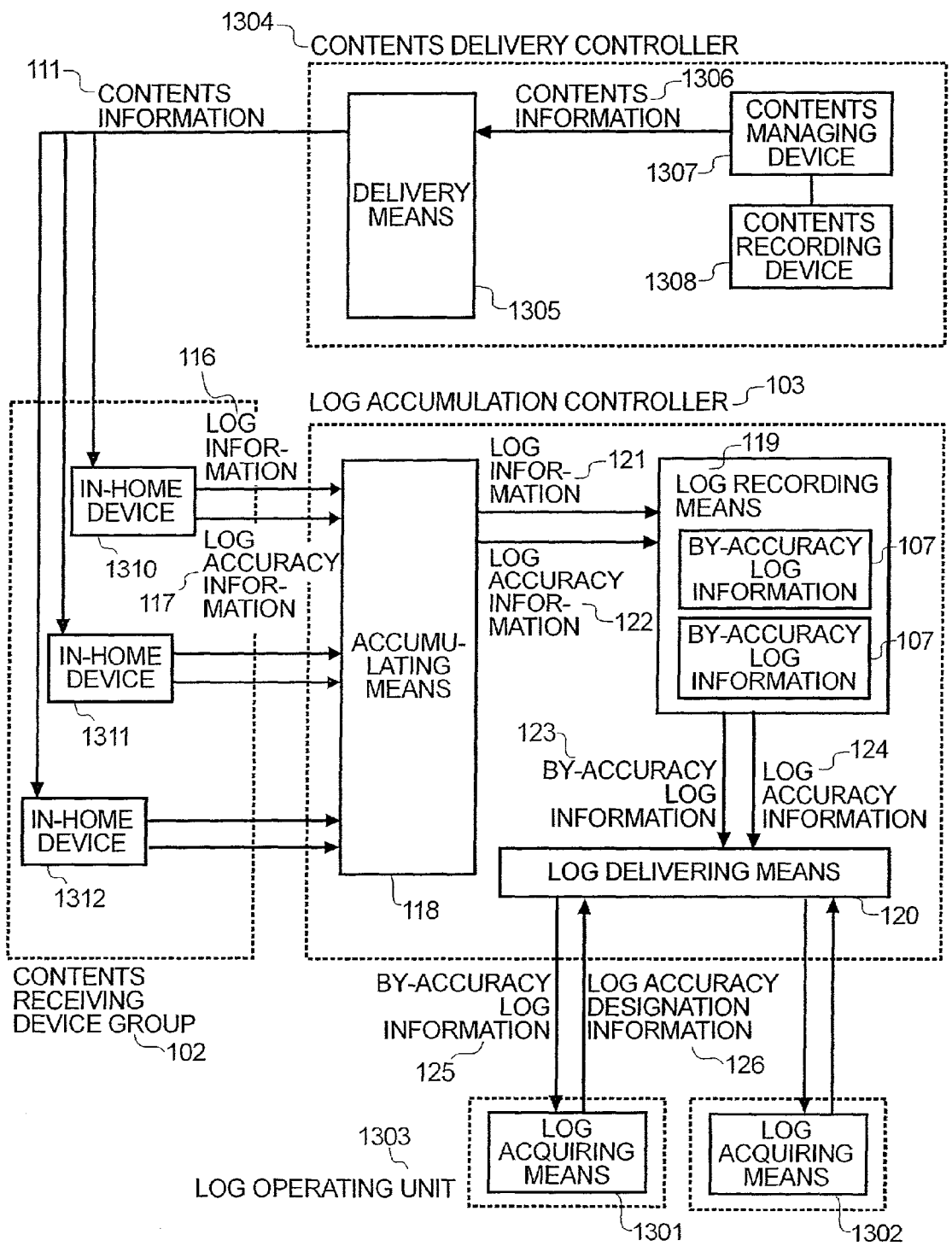
FIG. 13 is a diagram snowing a system configuration according to another embodiment of the present invention.

A still further embodiment of the present invention will be explained below with reference to FIG. 13. The present embodiment is an embodiment showing a configuration wherein no contents selection information is included in contents information. FIG. 13 is a system configurational diagram showing a configuration of a log collecting system according to the present embodiment. In FIG. 13, reference numerals 1310, 1311 and 1312 indicate in-home devices respectively. Reference numeral 103 indicates a log accumulation controller, reference numeral 1303 indicates a log operating unit, and reference numeral 1304 indicates a contents delivery controller, respectively. The present embodiment is similar to the previous embodiment in terms of the operations of acquisition and sending of log information from each in-home device, and the operations of accumulation and delivery of logs by the log accumulation controller, and the description thereof will therefore be omitted herein. Each of the in-home devices is capable of reproducing contents information having no contents selection information delivered from the contents delivery controller. User-designated information such as the operation of selecting contents by a user, the operation of each in-home device by the user, etc. are subjected to conversion corresponding to the accuracy similar to the previous embodiment. Besides, the converted information can be sent to the log accumulation controller 103 as log information. The log accumulation controller 103 manages log information and log accuracy information obtained from the in-home devices 1310, 1311, and 1312 as log information set according to accuracy. The log operating unit 1303 acquires by-accuracy log information each having a specified log accuracy from the log accumulation controller by means of the log acquiring devices 1301 and 1302. The contents delivery controller 1304 delivers contents information stored in a contents storage device 1308 to each in-home device through a contents managing device 1307 and a delivery device 1305.

According to the present embodiment as described above, the log information set according to the accuracy can be acquired at the log operating unit and various services and products based on the log information can be provided. As to the contents delivery, the delivery of the common contents information having no contents selection information, and the acquisition of the log information with the user-designated information related to the sight and hearing of the contents information as the base are allowed.

Figure 14:
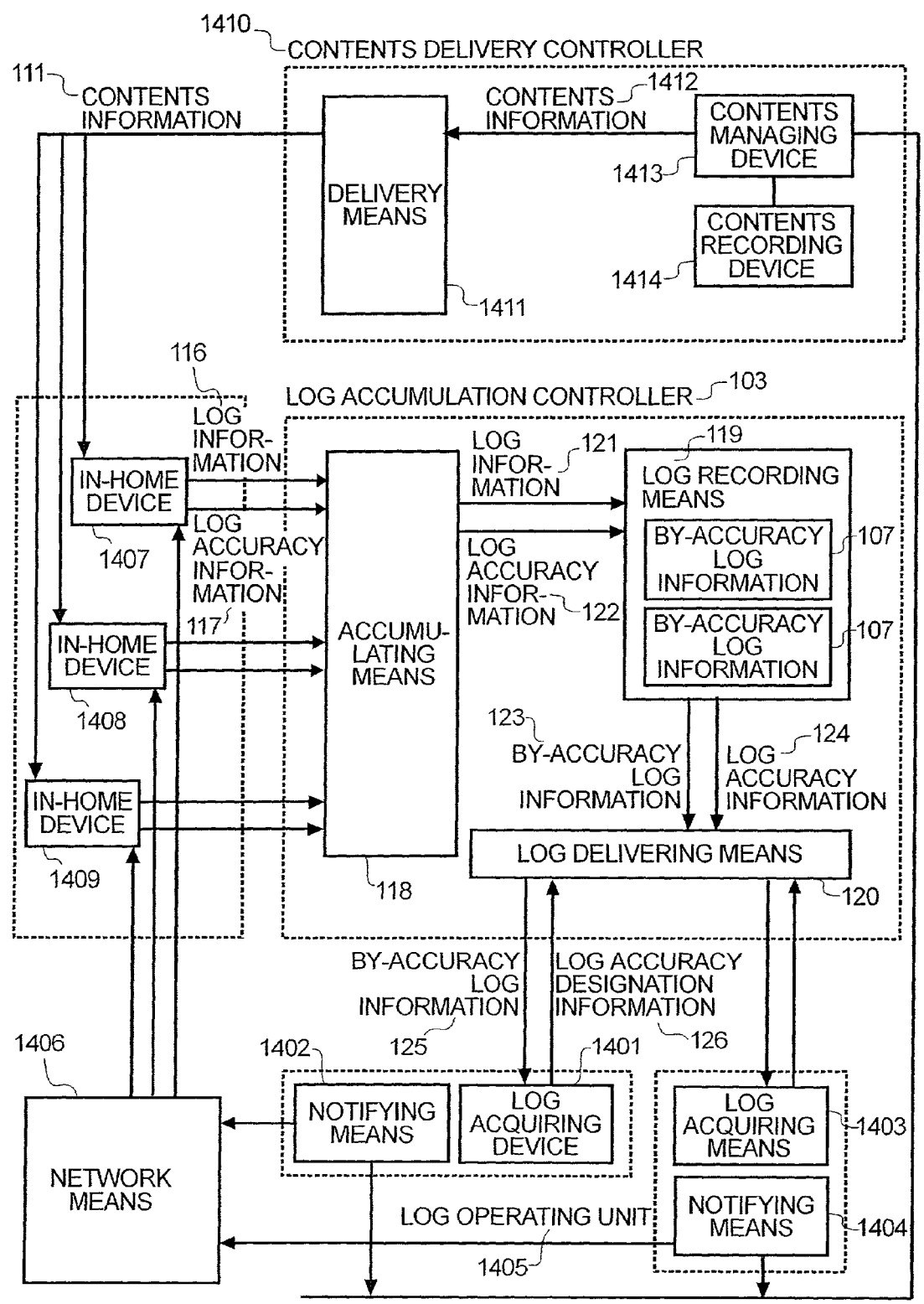
FIG. 14 is a diagram illustrating a system configuration according to a further embodiment of the present invention.

A still further embodiment of the present invention will be described below with reference to FIG. 14. FIG. 14 is a system configurational diagram showing a configuration of a log collecting system according to the present embodiment. The present embodiment is an embodiment showing a system form wherein contents selection information is delivered through a communication path other than a contents delivering means. In FIG. 14, reference numeral 1406 indicates a network communication means such as an Internet, a dedicated line or the like, reference numerals 1402 and 1404 respectively indicate notifying or communication means capable of transmitting contents selection information to each of in-home devices through the Internet, and reference numerals 1407, 1408 and 1409 respectively indicate the in-home devices capable of acquiring the contents selection information through the network means 1406. Further, a log accumulation controller 103 performs a function and operation equivalent to those of the log accumulation controller according to the previous embodiment. The operation of the log accumulation controller 103 will not be described herein in particular.

A log operating unit 1405 creates contents information, based on log information set according to the accuracy, which are acquired by log acquiring devices 1401 and 1403. The notifying means 1402 and 1404 are used to notify contents selection information of the created contents information to their corresponding in-home devices by means of the network means 1406. The contents information other than the contents selection information are sent to a contents delivery controller 1410 from which they are delivered to the in-home devices 1407, 1408 and 1409 respectively. The in-home devices 1407, 1408 and 1409 are respectively capable of selectively reproducing and recording contents information corresponding to stored user-designated information, based on the contents selection information obtained through the network means 1406, and contents substantial information delivered from the contents delivery controller 1410.

According to the present embodiment as described above, the contents selection information can be delivered through the network path different from one for the contents substantial information. Therefore, there is no need to simultaneously make timings provided to send the contents substantial information and the contents selection information, and the degree of freedom of sending of the contents information is improved. Redelivering only the contents selection information to each in-home device can change the contents selection information for the same contents substantial information. Further, a plurality of contents selection information to be transmitted are prepared and the contents selection information delivered according to the in-home devices can be changed in this state. Thus, the contents information reproduced based on the contents selection information can be changed according to the in-home devices, and hence the degree of freedom of the delivered contents or substance related to the contents is enhanced.

Figure 15:
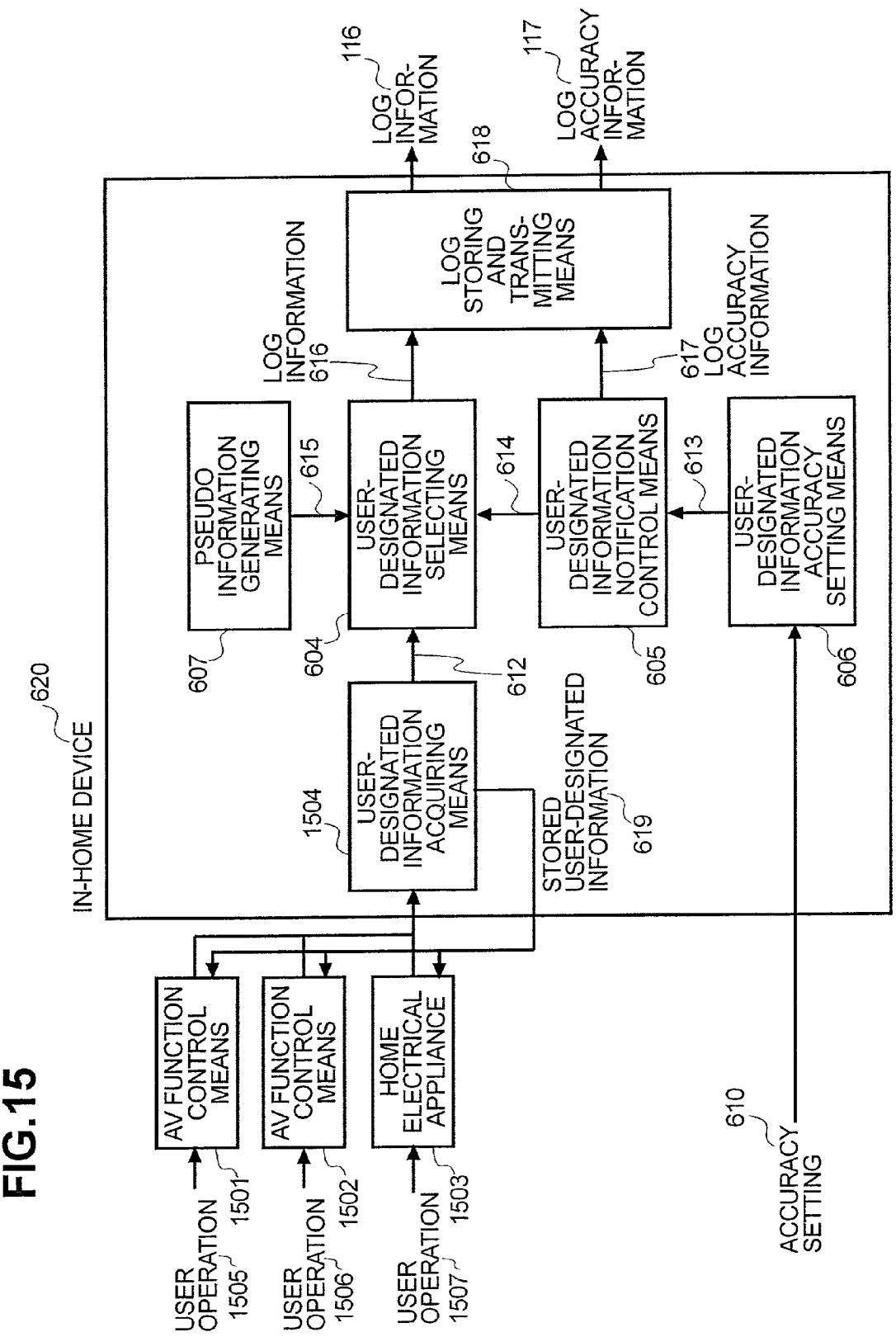
FIG. 15 is a diagram depicting a system configuration according to a still further embodiment of the present invention.

A still further embodiment of the present invention will be described below with reference to FIG. 15. FIG. 15 is a system configurational diagram showing a configuration of an in-home device according to the present embodiment. In FIG. 15, reference numerals 1501 and 1502 respectively indicate AV function control means connected to the in-home device through communication means such as wire/wireless means at all times or whenever necessary, reference numeral 1503 indicates a home appliance such as a refrigerator, a washing machine connected to the in-home device through the communication means such as the wire/wireless means at all times or whenever necessary, and reference numeral 1504 indicates a user-designated information acquiring means capable of acquiring information about a user operation and user's instructions from the AV function control means 1501 and 1502 and the home appliance 1503, respectively. The operation of the present embodiment will be explained below with reference to FIG. 15. Information about the operation and selection of the home appliance 1503 by a user is acquired by the user-designated information acquiring means 1504 and transmitted to a log accumulation controller together with log accuracy information as part of log information. When the setting of accuracy of a log is set to 40%, for example, 40% of the user-designated information obtainable from the operation for the home appliance 1503 can be transmitted as log information.

According to the present embodiment as described above, the log accumulation controller is capable of offering by-accuracy log information related to the home appliance to a log operating unit.

In the configuration wherein the contents selection information is included in the contents information, instructions for a method of reproducing contents according to the result of stored user-designated information for the home appliance, etc. are included in the condition of selection of the contents selection information, whereby a change in the reproduced contents corresponding to the operation of the home appliance, etc. can be carried out. For example, a usage method is allowed wherein the numbers of closings and openings of the refrigerator are acquired as log information and advertising contents of a refrigerator reduced in temperature rises at its opening and closing is delivered the numbers of closings and openings are above a predetermined number.

According to the present embodiment as described above, objects for log acquisition can be expanded into the home appliance other than the AV function control device. Thus, the acquisition of a log based on the operation for the home appliance except for the operation of the AV function control device, the selective reproduction of contents information corresponding to stored user-designated information, etc. can be carried out.

While the present embodiment has adopted the configuration herein the AV function control device and the home appliance are provided in mixed form, for example, a configuration may be adopted wherein only the home appliance is connected to the in-home device. The format and configuration of connection between an in-home device and an external device are not defined in particular.

According to the present invention, a user-designated information accuracy setting means, a user-designated information notification control means, and a user-designated information notifying means are provided in an information processing apparatus or unit such as an in-home device or the like, whereby a user is able to designate the accuracy of provision of log information, and the degree of freedom of the disclosure of log information by the user is improved.

According to the present invention as well, a storage means specifying means or a storage area specifying means is provided in a log accumulation controller, whereby log information provided or offered in diversified provision accuracies can be collected, classified and managed with efficiency. Log information each having a necessary log accuracy can be provided for a log operating unit. Thus, the efficiency of operation of the log information is improved.

Further, according to the present invention, a selection information processing means is provided within an information processing apparatus or an AV function control means placed outside the information processing apparatus, whereby a method of reproducing contents substantial information, can be changed based on acquired user-designated information and contents selection information, or log information and contents selection information obtained by processing user-designated information with accuracy information. Further, contents corresponding to each individual user who makes use of the information processing apparatus, can be delivered and reproduced.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An information apparatus comprising:
   user-designated information acquiring means for acquiring sequential user-designated information which changes in accordance with time at a constant period or cycle, the acquired sequential information including information regarding selections made by a user;

accuracy setting means for specifying accuracy setting information in response to user input, said accuracy setting information including a ratio of disclosure of the acquired sequential information to an external device; and information notifying means controlled according to the accuracy setting information specified by the accuracy setting means for transmitting log information which changes in accordance with time to the external device, said log information being obtained by restricting acquired sequential information according to the ratio of disclosure, further comprising:

pseudo information generating means configured to generate pseudo user-designated information composed of the same format as user-designated information, wherein the pseudo user-designated information comprises at least some content to be regarded as user-designated information and at least some content that is different from the user-designated information, wherein a part of the acquired sequential information from the user-designated information acquiring means is replaced with the pseudo user-designated information according to the ratio of disclosure to form the log information.

2. The information processing apparatus according to claim 1, further including:
   storing means configured to store information, said stored information including at least one of part of the log information and the accuracy setting information,
   wherein the information notifying means is configured to transmit the stored information to the external device.

3. The information processing apparatus according to claim 1, wherein the user-designated information acquiring means acquires the user-designated information from external audio-visual (AV) devices respectively having AV function control means, which are independent of the information processing apparatus.

4. The information processing apparatus according to claim 1, wherein the user-designated information acquiring means acquires user-designated information from a home appliance independent of the information processing apparatus.

5. The information processing apparatus according to claim 1, wherein a method, for (a) receiving contents information, said contents information comprising both substantial information and contents selection information for specifying a method of playing back at least part of the substantial information and (b) playing back of the substantial information, is determined according to the contents selection information and the sequential user-designated information.

* * * * *